UNITED STATES PATENT OFFICE.

REIDAR BLOM, OF RJUKAN, NORWAY, ASSIGNOR TO NORSK HYDRO-ELEKTRISK KVAELSTOFAKTIESELSKAB, OF CHRISTIANIA, NORWAY.

PROCESS OF MANUFACTURING AMMONIUM NITRATE.

1,256,513.  Specification of Letters Patent. Patented Feb. 12, 1918.

No Drawing. Application filed July 20, 1916. Serial No. 110,348.

*To all whom it may concern:*

Be it known that I, REIDAR BLOM, a subject of the King of Norway, residing at Rjukan, Norway, have invented certain new and useful Improvements in Processes of Manufacturing Ammonium Nitrate; and I do hereby declare the following to be a full, clear, and exact description of the invention, such as will enable others skilled in the art to which it appertains to make and use the same.

This invention relates to the manufacture of ammonium nitrate and has for its object improvements in a process of manufacturing ammonium nitrate from gaseous ammonia and nitric acid.

For manufacturing ammonium nitrate of such high purity as is required for several purposes one has hitherto been restricted to the method of neutralizing pure concentrated ammonia water with nitric acid.

When in this process use is made of the dilute nitric acid resulting from the absorption of nitrous gases in water, only a low grade solution of nitrate is obtained which requires large expenses of evaporation in order to render solid salt. Nor are much better economical results obtained by previously concentrating the nitric acid, as then the concentration expenses of the acid make themselves unfavorably felt.

According to the present invention it is possible to make highly concentrated solution of ammonium nitrate or even this salt in the solid state directly by means of the dilute acid. The process is based upon the observation that solutions of ammonium nitrate are excellent absorbents for ammonia gas. Therefore the dilute solutions of ammonium nitrate obtained by neutralizing ammonia water with dilute nitric acid or in any other way may be used for absorption of ammonia gas, and the ammoniacal solution so obtained is neutralized with dilute nitric acid. By repeating at will these operations of absorption and neutralization it is possible to obtain saturated solutions of ammonium nitrate or a precipitation of the solid salt respectively the cost of evaporation thus being reduced to quite a minimum or even totally eliminated.

This method offers particular advantages, when the neutralization is effected by means of the nitric acid containing liquid which results on absorbing nitrous gases in a solution of ammonium nitrate. Then the concentration of ammonium nitrate is greatly increased by each neutralizing operation because no supply of water takes place except the small quantities of moisture contained in the nitrous gases and the ammonia.

By effecting the absorption of ammonia gas in a neutral liquid the great technical difficulties are obviated, which adhere to the direct absorption of ammonia gas in nitric acid owing to the formation of fumes, that involve losses of ammonium nitrate, unless very extensive and complex apparatus be used. Another advantage of my manner of working lies in the fact that the heat of neutralization is not developed during the absorption process, when efficient cooling devices cannot easily be arranged, but the neutralization is brought about in a particular operation that allows of convenient cooling.

Claims:

1. The process of manufacturing ammonium nitrate from ammonia gas and nitric acid, comprising the steps of saturating ammonium nitrate solutions with ammonia gas, supplying nitric acid to the ammoniacal solution, using the solution so obtained for further absorption of ammonia gas followed by neutralization until the required concentration of ammonium nitrate is obtained and evaporating the solution.

2. The process of manufacturing ammonium nitrate from ammonia gas and nitric acid comprising the steps of saturating ammonium nitrate solutions with ammonia gas, supplying nitric acid to the ammoniacal solution, using the solution so obtained for further absorption of ammonia gas followed by neutralization until solid ammonium nitrate precipitates and separating the solid salt from the solution.

3. The process of manufacturing ammonium nitrate from ammonia gas and nitric acid comprising the steps of saturating ammonium nitrate solution with ammonia gas, neutralizing the solution with nitric acid, using the solution over and over again for absorption and neutralization until solid ammonium nitrate precipitates, separating the solid salt from the solution and using the mother liquor for saturation with ammonia gas and neutralization with nitric acid, to get further quantities of ammonium nitrate precipitated.

4. The process of manufacturing ammonium nitrate from ammonia gas and nitric acid comprising the steps of saturating ammonium nitrate solution with ammonia gas, neutralizing the solution with the nitric acid liquor obtained by absorbing nitrous gases in ammonium nitrate solutions, subjecting a portion of the neutralized solution to saturation with ammonia and treating another portion of the solution with nitrous gases, neutralizing the portions mutually and repeating the operations of absorption and neutralization until the required quantity of ammonium nitrate is formed.

In testimony that I claim the foregoing as my invention, I have signed my name in presence of two subscribing witnesses.

REIDAR BLOM.

Witnesses:
C. NORMAN,
C. FABRICIUS HANSEN.